United States Patent [19]
Steele

[11] 3,881,033
[45] Apr. 29, 1975

[54] SOYBEAN PROCESS
[75] Inventor: Robert L. Steele, Stamford, Conn.
[73] Assignee: Standard Brands Incorporated, New York, N.Y.
[22] Filed: Oct. 30, 1972
[21] Appl. No.: 302,144

[52] U.S. Cl. ............ 426/385; 426/438; 426/441; 426/460; 426/466
[51] Int. Cl. .............................................. A23l 1/20
[58] Field of Search ........... 426/384, 385, 438, 441, 426/445, 455, 456, 460, 461, 466, 467, 469

[56] References Cited
UNITED STATES PATENTS

| 3,203,808 | 8/1965 | Thompson et al. ................. 426/518 |
| 3,294,549 | 12/1966 | Vix et al. ............................. 426/378 |
| 3,598,610 | 8/1971 | Hawley et al. ...................... 426/460 |
| 3,787,595 | 1/1974 | Folzenlogen et al. ............... 426/384 |

Primary Examiner—Norman Yudkoff
Assistant Examiner—Curtis P. Ribando

[57] ABSTRACT

Hydrated soybeans are freeze dried to provide soybeans having improved texture and substantially free of objectionable aromas and flavors.

7 Claims, No Drawings

SOYBEAN PROCESS

This invention relates to a process for improving the texture and flavor of soybeans. More particularly, this invention relates to a process for imparting crisp, nut-like texture to soybeans which are substantially free of objectionable aromas and flavors.

Soybeans are grown in vast quantities and are highly valued for their oil and protein content. The bulk of the soybeans grown in this country are processed to separate the oil leaving a residue which is used as animal feed or, to a limited extent, is further processed into flakes, flour, protein concentrates and the like. It has long been recognized that, because of their availability and nutritional value, soybeans could provide a highly desirable food product. Attempts to convert soybeans into acceptable food products, however, have been less than completely successful for various reasons. Among these are objectionable organoleptic characteristics and texture.

Soybeans, and products made from soybeans, usually have a characteristic green or beany aroma and flavor which most people find objectionable. A number of processes are known in the art which, to a greater or lesser extent, reduce these aromas and flavors to acceptable levels. Efforts to impart a suitable texture to soybeans, however, have been less successful.

The concept of texture as it relates to food is nebulous, to say the least. Webster's Seventh New Collegiate Dictionary defines texture as "the disposition or manner of union of the particles of a body or substance." Little is known concerning the actual structural characteristics which impart desirable texture to foods and what advances have been made in this area have resulted largely from empirical observations. This is particularly true of solid foods which must be thoroughly chewed to release their flavor and prepare them for digestion. It is generally agreed, however, that nuts, e.g., peanuts, pecans, cashews and the like, have a pleasing texture. Soybeans, on the other hand, even when subjected to considerable processing, are generally considered to be too hard and gritty and provide an undesirable mouth feel when chewed.

For the purposes of this invention, it should be understood that the term soybeans includes blanched or unblanched soybeans, with or without hulls, and pieces thereof.

There are a number of processes known in the art for improving the palatability and texture of soybeans. U.S. Pat. No. 2,083,853 to McComb relates to a process for imparting nut-like consistency to soybeans which includes hydrating soybeans to remove the hulls or skins therefrom and to cause swelling thereof. The hydrated beans are then heated in an edible oil to cause the moisture in the beans to be converted to steam. This internal generation of steam improves the palatability of the beans. U.S. Pat. No. 2,761,781 to Bailey relates to a process for increasing the friability of nut kernels, including soybeans, by subjecting the kernels to pressure of a gas in a closed pressure reactor to fracture the internal body tissue of the kernels. U.S. Pat. No. 2,789,055 to Blatt discloses a process for improving the palatability of soybeans by heating the beans at reduced pressure and then treating the beans with nitrous oxide at elevated temperatures and pressures. U.S. Pat. No. 2,795,502 to Raymond relates to a process for producing soybean products by soaking soybeans in water containing an ammonium salt, allowing the beans to ferment somewhat and cooking the beans.

It is the principal object of the present invention to provide a process for treating soybeans to improve their texture and organoleptic characteristics.

This object and other objects of the present invention which will be apparent from the following description are obtained in accordance with the present invention by contacting soybeans with water to effect absorption of water therein, subjecting the beans to reduced temperatures to freeze the absorbed water and subjecting the beans to reduced pressures to sublimate at least a portion of the frozen water from the beans.

When soybeans are soaked in an aqueous medium, the beans will absorb a certain quantity of water. The amount of water absorbed is dependent upon the temperature and period of soaking. During soaking, the beans will expand and when the beans have absorbed the maximum amount of water, they will have swelled or expanded to about twice their original size. It is a preferred embodiment of the present invention that absorption is effected by heating the beans in water at a temperature of from about 180° to about 212°F. for a period of from about 20 to about 60 minutes.

The absorbed water in the beans may be frozen in any convenient manner. For instance the beans may be contacted directly or indirectly with a refrigerant such as liquid nitrogen or they may be placed in a vacuum chamber wherein a vacuum is applied to the beans to cause evaporative cooling with resulting super-cooling and sudden freezing of the absorbed water.

The frozen absorbed water in the beans may be removed therefrom by any conventional sublimation process, such as are generally referred to in the art as freeze-drying. Techniques and apparatus for effecting freeze-drying are well known in the art. Treatment of the beans in this manner maintains the beans in their swollen state and imparts a nut-like texture thereto. When absorbed water in soybeans is removed by evaporation, the beans return substantially to their original size and their textural properties are objectionable. Microscopic examination of cross-sections of hydrated soybeans which were dried by evaporative means revealed an interior structure of randomly distributed open spaces between areas of cellular material whereas hydrated beans which have been freeze-dried had a remarkably uniform interior structure. Although I do not wish to be bound by any theory, it is believed that this difference in structure of the soybeans accounts for the improved texture of soybeans prepared in accordance with the method of the present invention.

After the soybeans are freeze-dried, it is preferred that they be cooked to provide a product having crisp nut-like textural and organoleptic characteristics. A variety of cooking procedures may be used such as those commonly used in the snack industry. For instance, the beans may be dry or oil roasted. A particular preferred product is obtained by first soaking the freeze-dried soybeans in an edible oil so that some oil is absorbed into the beans and then heating the beans in air to provide a dry-roasted type product.

The soybeans may be treated with a variety of flavors, spices and the like. These materials may be added to the surface of the soybeans or added to the water in which the beans are hydrated or to the oil in which the beans are cooked or otherwise treated. Exemplary of such materials are salt, monosodium glutamate, sugar, cinnamon, barbecue sauce, chocolate and the like.

It is a particular preferred embodiment of the present invention that after the soybeans are hydrated they are subjected to a softening or tenderization treatment. This may be accomplished by heating the hydrated beans under pressure in an autoclave or other suitable pressure vessel at about 15 psig for a period of from about 5 to about 25 minutes.

In order to more clearly describe the nature of the present invention, specific examples will hereinafter be described. It should be understood, however, that this is done solely by way of example and is not intended to delineate the scope of the invention or limit the ambit of the appended claims.

EXAMPLE I

This Example illustrates an embodiment of the present invention in which soybeans after being hydrated and prior to being freeze-dried are tenderized by a pressure treatment.

225 grams of dehulled soybeans were added to 900 ml of boiling water. The boiling was continued for 60 minutes until the beans were hydrated and assumed an expanded size. The hydrated beans were placed in an autoclave and heated at 15 psig for 15 minutes. The beans were frozen by suspending them in an insulated container over liquid nitrogen through which compressed air was passed to provide forced circulation of freezing gas. The frozen beans were then placed in a Stokes Model 902–001–8 freeze dryer and dried until equilibrium was attained at a platen temperature of 100°F. and a chamber pressure of 15 mm of mercury. The freeze dried beans were cooked in oil at a temperature of 325°F. for 3 minutes and cooled. The treated beans had good organoleptic characteristics and a pleasing texture.

EXAMPLE II

This Example illustrates an embodiment of the present invention in which soybeans after being freeze dried are cooked in oil under a partial vacuum.

454 grams of dehulled soybeans were added to 1500 ml of boiling water containing 300 grams of sucrose and boiling continued for 60 minutes. The hydrated beans were then heated in an autoclave and freeze dried as described in Example I. The freeze dried beans were placed in oil which had been heated to 340°F. within a vacuum flask under a vacuum of 29 inches of mercury. The vacuum was reinstated and heating of the oil was continued at 340°F. for 4.5 minutes after which the beans were removed from the oil, allowed to drain and cooled. The treated soybeans have a desirable texture and a sweet flavor.

EXAMPLE III

This Example illustrates an embodiment of the present invention in which soybeans after being freeze-dried are soaked in oil and dry roasted.

225 grams of dehulled soybeans were added to 900 ml of boiling water containing 31.5 grams of NaCl and 13.5 grams of monosodium glutamate and boiling continued for 60 minutes. The hydrated beans were then heated in an autoclave and freeze dried as described in Example I. The freeze dried beans were soaked in oil for 180 minutes, drained, and dry roasted at a temperature of 295°F. for 12 minutes. The treated beans had a desirable texture and good organoleptic characteristics.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A process for treating soybeans to improve their texture and organoleptic characteristics comprising contacting soybeans with water to affect absorption of water therein, subjecting the hydrated beans to a pressure treatment to soften the beans, subjecting the beans to reduced temperatures to freeze the absorbed water and subjecting the beans to reduced pressures to sublimate at least a portion of the frozen water from the beans.

2. A process for treating soybeans as defined in claim 1, wherein the soybeans after being subjected to reduced pressures to sublimate at least a portion of the frozen water from the beans are cooked at elevated temperatures.

3. A process for treating soybeans as defined in claim 2, wherein the soybeans are cooked in an edible oil.

4. A process for treating soybeans as defined in claim 2, wherein the soybeans prior to being cooked are soaked in an edible oil and then are dry roasted.

5. A process for treating soybeans as defined in claim 1, wherein soybeans are contacted with water under conditions whereby they expand to about twice their original size.

6. A process for treating soybeans as defined in claim 5, wherein the soybeans are contacted with water at a temperature of from about 180° to about 212°F. for a period of from about 20 to about 60 minutes.

7. A process for treating soybeans as defined in claim 6, wherein the soybeans are pressure treated at a pressure of about 15 psig at elevated temperatures for a period of from about 5 to about 25 minutes.

* * * * *